(12) United States Patent
Kumar et al.

(10) Patent No.: US 11,095,684 B2
(45) Date of Patent: Aug. 17, 2021

(54) PROVIDING ATTRIBUTES OF A NETWORK SERVICE

(71) Applicant: Fortanix, Inc., Mountain View, CA (US)

(72) Inventors: Ambuj Kumar, Sunnyvale, CA (US); Andrew Leiserson, San Francisco, CA (US)

(73) Assignee: Fortanix, Inc., Mountain View, CA (US)

( * ) Notice: Subject to any disclaimer, the term of this patent is extended or adjusted under 35 U.S.C. 154(b) by 303 days.

(21) Appl. No.: 16/241,771

(22) Filed: Jan. 7, 2019

(65) Prior Publication Data

US 2020/0220898 A1 Jul. 9, 2020

(51) Int. Cl.
*H04L 29/06* (2006.01)
*H04L 9/30* (2006.01)
*G06F 21/53* (2013.01)
*H04L 9/32* (2006.01)

(52) U.S. Cl.
CPC .............. *H04L 63/20* (2013.01); *G06F 21/53* (2013.01); *H04L 9/30* (2013.01); *H04L 9/3268* (2013.01); *G06F 2221/2149* (2013.01)

(58) Field of Classification Search
CPC ......... H04L 63/20; H04L 9/30; H04L 9/3268; H04L 9/3247; H04L 9/0894; H04L 63/105; G06F 21/53; G06F 2221/2149; G06F 21/6245
See application file for complete search history.

(56) References Cited

U.S. PATENT DOCUMENTS

| | | | | |
|---|---|---|---|---|
| 6,629,150 B1* | 9/2003 | Huded | ................... | G06F 21/64 707/999.004 |
| 6,975,727 B1* | 12/2005 | Vandergeest | .......... | H04L 9/0891 380/273 |
| 10,911,538 B2* | 2/2021 | Kumar | ................... | H04L 63/06 |
| 2014/0108805 A1* | 4/2014 | Smith | ................... | G06F 21/126 713/171 |
| 2014/0149557 A1* | 5/2014 | Lohmar | ................ | H04L 65/605 709/219 |
| 2014/0149738 A1* | 5/2014 | Rhelimi | .................. | H04L 9/321 713/156 |
| 2014/0317738 A1* | 10/2014 | Be'ery | .................... | H04L 63/14 726/23 |
| 2015/0033316 A1* | 1/2015 | Scarlata | ................ | H04L 9/3213 726/9 |
| 2015/0244676 A1* | 8/2015 | Collins | ................... | H04L 43/16 726/12 |
| 2016/0085695 A1* | 3/2016 | Leslie-Hurd | ............ | G06F 21/79 711/163 |
| 2016/0269237 A1* | 9/2016 | Higgins | ................ | H04W 12/08 |
| 2019/0121813 A1* | 4/2019 | Galebach | .............. | H04L 9/3247 |
| 2019/0342356 A1* | 11/2019 | Thomas | ......... | H04N 21/234309 |

* cited by examiner

*Primary Examiner* — J. Brant Murphy
(74) *Attorney, Agent, or Firm* — Lowenstein Sandler LLP

(57) ABSTRACT

A network service may be identified. One or more attributes of the network service may be determined. An attribute manifest for the network service may be generated based on the determined one or more attributes of the network service. Furthermore, the attribute manifest may be transmitted based on the determined one or more attributes to the network service.

17 Claims, 7 Drawing Sheets

PROVIDING ATTRIBUTES OF A NETWORK SERVICE

TECHNICAL FIELD

Aspects of the present disclosure relate generally to network services, and more specifically, relate to providing attributes of a network service.

BACKGROUND

A network service may provide one or more services for users over a network. For example, the network service may be provided by a server so that users may access the network service at the server over the network. Users of the network service may interact with the network service by providing data for use by the network service. A provider of the network service may notify the users with respect to how the provided data may be used by the network service. For example, the provider may specify a privacy policy indicating how the provided data may be stored or used by the network service.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
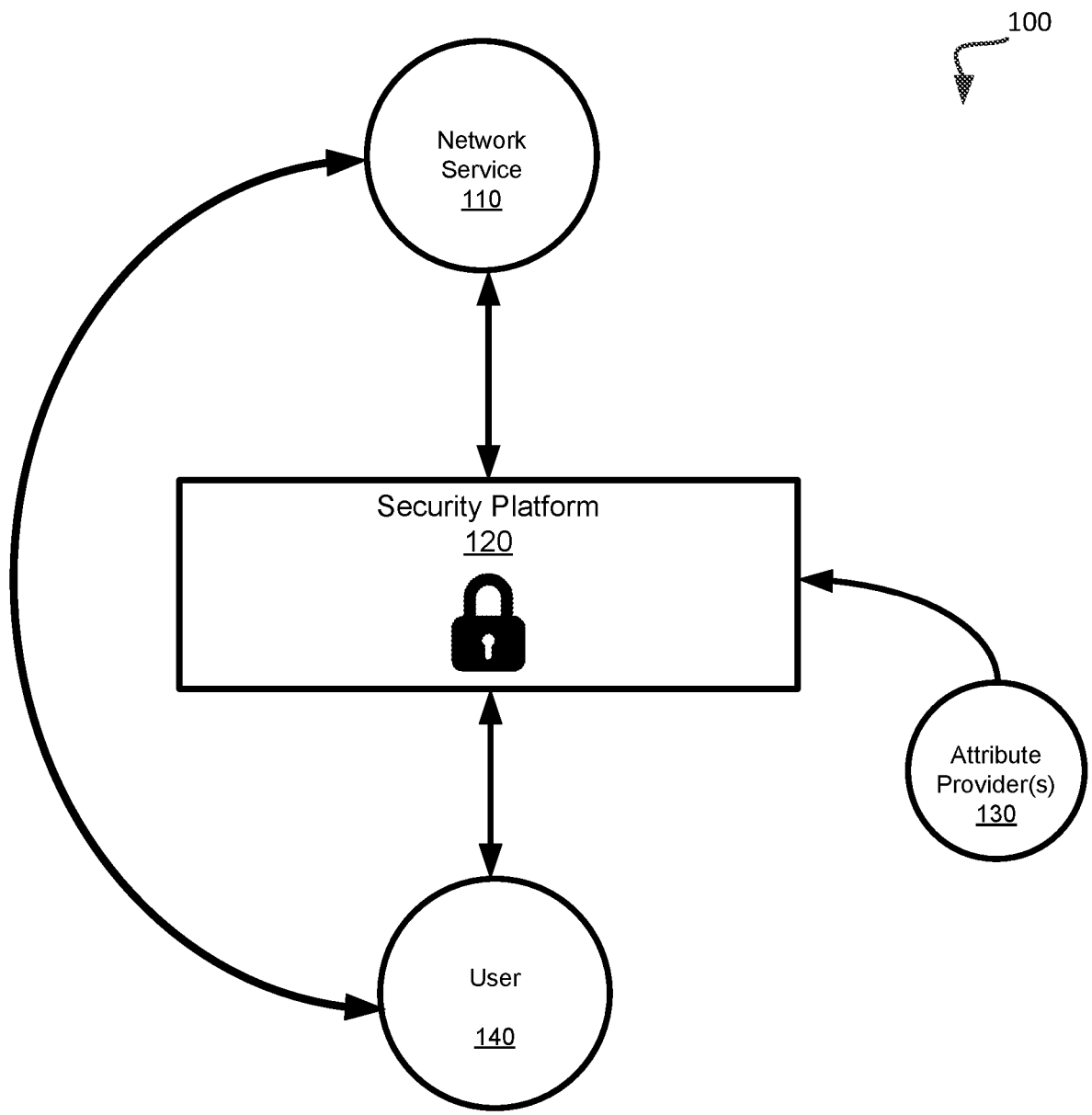
FIG. 1 illustrates an environment to provide attributes of a network service in accordance with some embodiments.

Aspects of the present disclosure relate to the providing of attributes of a network service. In general, users may interact with the network service. The users may provide data to the network service and the network service may utilize the data provided by the users. As an example, the data may correspond to personal data of the users and the network service may store the data at a server of the network service and/or provide additional services with respect to the provided data.

The operating entity of the network service may provide a privacy policy (or other such information) specifying how the network service will utilize the provided data or may specify other such characteristics of the network service (e.g., a geographical region of the server providing the network service). For example, the operating entity may publish such information at an accessible network location so that users of the network service may access and review the information relating to the network service.

The operating entity of the network service may update the network service at later time after the information specifying characteristics of the network service is published. For example, the software code of at least a portion of the network service may be altered. If a characteristic of the network service is also altered as a result of the change to the software code, then the information specifying characteristics of the network service that have been published may thus be outdated. For example, the information may specify that provided to the network service is to be stored in an encrypted form, but the change to the software code may result in the network service storing some of the data in an unencrypted form. Thus, the information published by the operating entity for the network service may not accurately reflect the current characteristics of the network service. Thus, if users seek to utilize the network service after the software code has changed, the users may not be able to securely rely upon the information that has been published by the operating entity.

Aspects of the present disclosure address the above and other deficiencies by utilizing a security platform to provide attributes of a network service. The attributes may specify one or more characteristics of the network service. For example, the attributes may specify how data is stored at the network service, security vulnerabilities of the network service, or any other information describing the operating state or actions of the network service. The attributes of a network service may be provided by the network service, third party reviewers (e.g., a security reviewer, compliance reviewer, etc.), and/or by the security platform. For example, the network service may provide claimed attributes and/or software code of the network service. The security platform may identify different software components that are used to provide the network service from the software code. In some embodiments, the security platform may assign attributes to the different software components and/or the third party reviewers may assign attributes to the different software components of the network service. As a result, one or more attributes of the network service may be assigned to the network service by the security platform. Subsequently, the security platform may generate a data structure (i.e., an attribute manifest) that identifies each attribute assigned to the network service and may sign the attribute manifest with a private key of the security platform.

The security manifest may subsequently be provided to the network service. When a user attempts to utilize the network service, then the signed attribute manifest may be transmitted from the network service to the user. In some embodiments, the user may receive a corresponding public key from the security platform. The user may verify the attribute manifest by using the corresponding public key. If the attribute manifest is verified, then the user may interact with the network service based on the attributes identified in the attribute manifest. For example, the user may utilize the network service and/or a notification or other such message may be provided to the user based on the attributes identified in the attribute manifest.

Advantages of the present disclosure include, but are not limited to, improved security for users of network services. For example, the security platform may be considered to be a trusted service for the user. If the user receives the attribute manifest that has been signed by the security platform and verifies the attribute manifest by using a public key of the security platform, then the user may rely on the attributes in the attribute manifest. As a result, the user may securely provide data to the network service and may utilize the network service based on the attributes that have been verified.

FIG. 1 illustrates an example environment 100 to provide attributes of a network service. In general, the environment 100 may include a network service 110, a security platform 120, one or more attribute providers 130, and a user 140.

As shown in FIG. 1, a user 140 may interact with a network service 110. For example, a computing device of the user 140 may connect over a network with a server of the network service 110. In some embodiments, the user 140 may provide data to the network service 110 and/or access a service provided by the network service 110. The network service 110 may be associated with one or more attributes where each attribute corresponds to a characteristic of the network service 110. A characteristic of the network service 110 may specify an operation, configuration, behavior, interaction, or any other aspect of the network service 110.

The security platform 120 may provide an attribute manifest to the network service 110. In some embodiments, the security platform 120 may be a separate and different server than the server providing the network service 110. Alternatively, the same server may provide both the security platform 120 and the network service 110. In some embodiments, the network service 110 and/or the security platform 120 may be executed in a secure enclave of a server as described in conjunction with FIG. 6. The attribute manifest generated by the security platform 120 may list one or more known attributes of the network service 110. In some embodiments, the attribute manifest may be a data structure that is generated and cryptographically signed with a private key by the security platform 120. The private key may be securely stored at the security platform 120. The attributes listed in the attribute manifest may be provided by the network service 110, identified by the security platform 120, and/or provided by one or more attribute providers 130. In some embodiments, the one or more attribute providers 130 may be third party entities that are separate from the security platform 120 and the network service 110. Each of the attribute providers 130 may provide an attribute based on analysis of the network service 110. For example, an attribute provider 130 may provide an attribute after analyzing the software code of the network service 110. In some embodiments, the one or more attribute providers 130 may be any or all of a security reviewer, compliance reviewer, privacy policy reviewer, etc. For example, the one or more attribute providers 130 may provide attributes identifying the security of the network service and/or any known vulnerabilities of the network service 110, whether the network service 110 satisfies certain compliance standards, whether the network service 110 satisfies particular data privacy policies, etc. The one or more attribute providers 130 may provide attributes of the network service 110 to the security platform 120 from a separate server.

In operation, the user 140 may connect with the network service 110. In some embodiments, the user 140 may further receive a digital certificate from the security platform 120 where the digital certificate includes a public key of the security platform 120. After the user 140 connects with the network service 110, the network service 110 may transmit the signed attribute manifest that has been provided by the security platform 120 to the user 140. The user 140 may subsequently verify the attribute manifest by using the public key from the digital certificate. If the public key of the digital certificate corresponds to the private key of the security platform 120, then the signature of the attribute manifest may be verified and the user 140 may rely on the attributes of the attribute manifest. Otherwise the user 140 may ignore the attribute manifest if the signature of the attribute manifest is not verified.

In some embodiments, the user 140 may view the attribute manifest from the security platform 120 that has been provided to the user 140 by the network service 110. In the same or alternative embodiments, the user 140 may initiate a transaction to view the attribute manifest where the transaction may correspond to a fee or a cost. A portion of the cost may be provided to each attribute provider 130 that has provided attributes to the security platform 120 for the network service 110. Another portion of the cost may be provided to the security platform 120.

Figure 2:
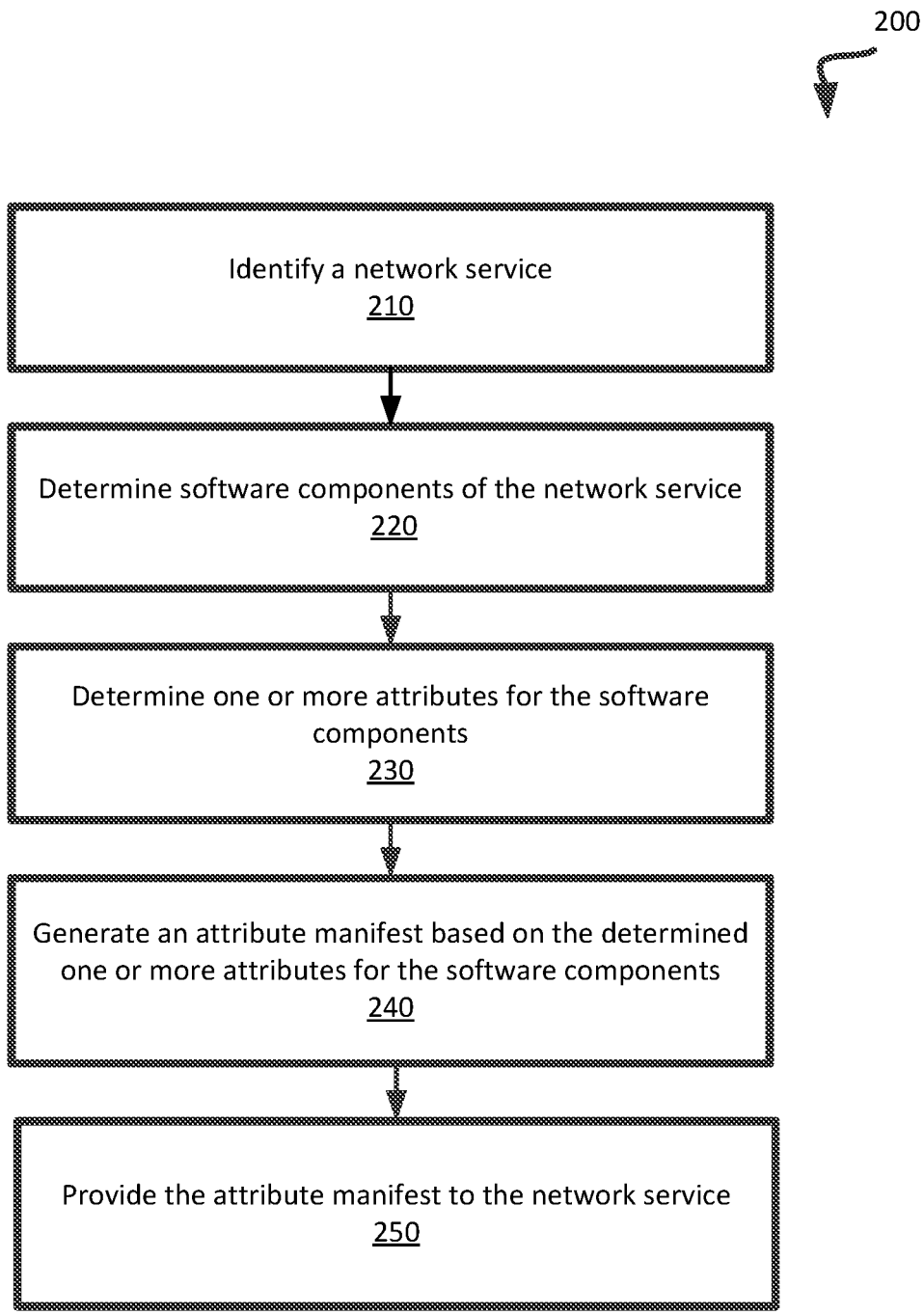
FIG. 2 is a flow diagram of an example method to provide an attribute manifest to a network service in accordance with some embodiments of the present disclosure.

FIG. 2 is a flow diagram of an example method 200 to provide an attribute manifest to a network service. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the security platform 120 of FIG. 1.

For simplicity of explanation, the methods of the present disclosure are depicted and described as a series of acts. However, acts in accordance with the present disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 2, the method 200 may begin with processing logic identifying a network service (block 210). For example, the network service may initiate a connection with a security platform for receiving an attribute manifest from the security platform. In some embodiments, the network service may provide software code or software components that are used to implement the network service. In the same or alternative embodiments, the network service may be a collection of different software components (i.e., software packages) where each software component performs a different function of the network service. The interaction of each of the software components may implement the network service.

The processing logic may further determine software components of the network service (block 220). For example, the network service may provide the software code implementing the network service via the different software components. For example, the functionality and operation of the network service may be separated into multiple software components. The software components may correspond to any type of software container or module (e.g., Ruby gems, Perl modules, Rust Crates, software libraries, etc.). Subsequently, the processing logic may determine one or more attributes for the software components (block 230). The attributes may be assigned to the software components. In some embodiments, the network service may assign and provide attributes for certain software components. In the same or alternative embodiments, third party attribute providers may assign and provide one or more attributes for one or more software components. The third party attribute providers may be security reviewers that review and inspect a particular software component and provide an assignment of one or more attributes to the particular software component. For example, the third-party attribute provider may analyze the software code and may provide an indication that the software code has been reviewed and may identify one or more attributes for the software code. In some embodiments, the software code may be provided from the network service to the security platform. The network service may indicate that some of the software code is to be analyzed by a third-party reviewer. As such, the security platform may subsequently transmit such software code to the appropriate third-party reviewer and may receive the corresponding attribute from the third-party reviewer.

Examples of attributes may include, but are not limited to, how data is saved when used by the particular software component (e.g., data is only saved when encrypted, passwords will not be stored in plaintext, data is not stored, data will not be transmitted to a server in a different geographical location, etc.), whether there is a security flaw or are not known security flaws with the software component (e.g., any bugs, memory vulnerabilities, etc.), whether the software component satisfies certain compliance requirements (e.g., privacy compliance, personally identifiable information (PII) data compliance, etc.), or any other identification with respect to a performance or behavior of the software component. In some embodiments, the security platform may have previously received or assigned attributes to software components of other network services. In such embodiments, the same attributes may be assigned to the same or similar software components. For example, if a same version of a software component is used in a first network service and a second network service, then the same attribute may be applied to the software component included in both network services.

Referring to FIG. 2, the processing logic may generate an attribute manifest based on the determined one or more attributes for the software components (block 240). The attribute manifest may be a data structure that identifies each attribute of any software component that is included in the software code of the network service. Thus, attribute manifest may include attributes for software components of the network service that have been received by different entities. Further details with respect to the contents of the attribute manifest are described in conjunction with FIG. 4. Subsequently, the processing logic may provide the attribute manifest to the network service (block 250). For example, the security platform may sign the attribute manifest with a private key stored at the security platform. The signed attribute manifest may then be transmitted to the network service.

Figure 3:
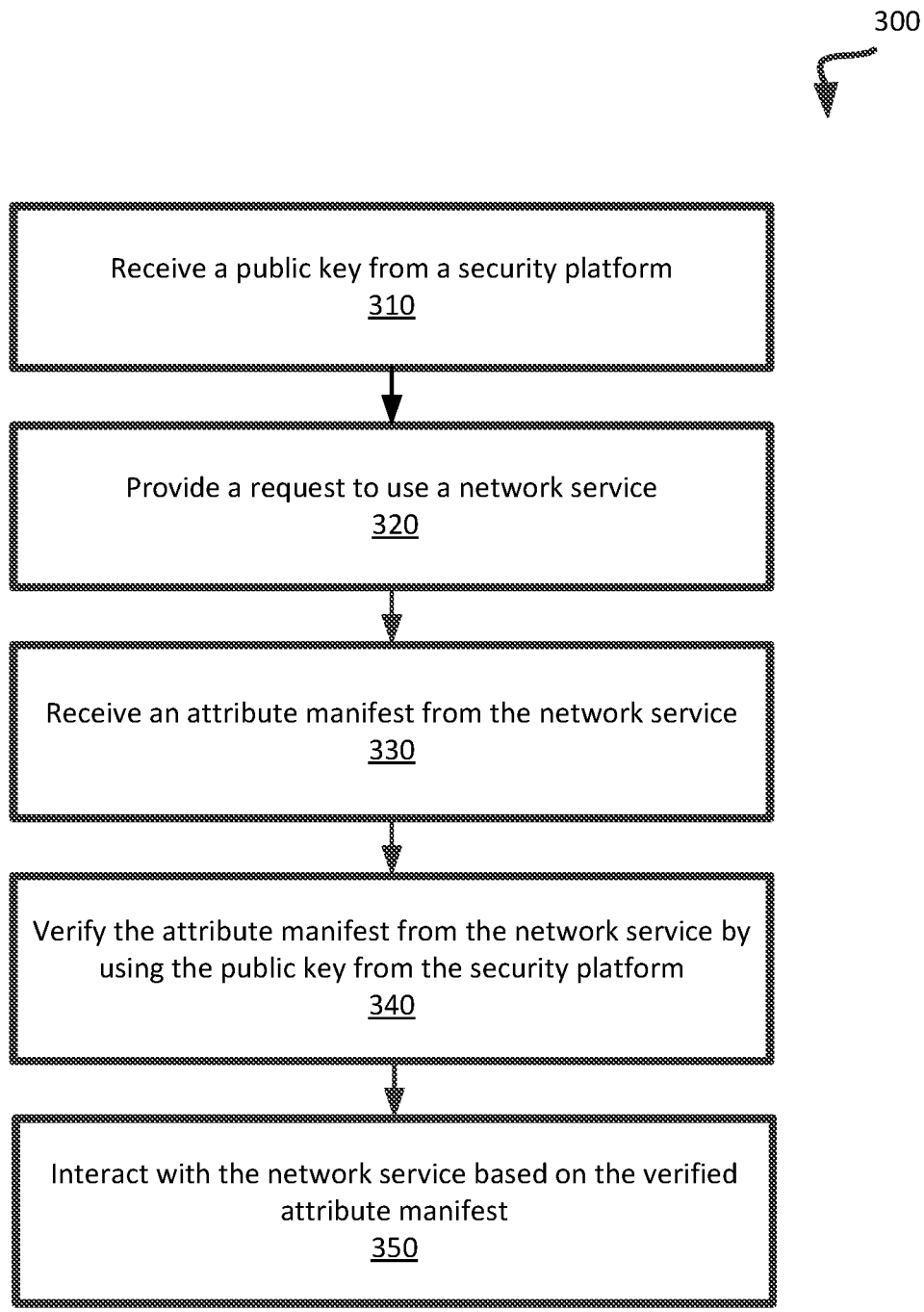
FIG. 3 is a flow diagram of an example method to interact with a network service based on an attribute manifest in accordance with some embodiments of the present disclosure.

FIG. 3 is a flow diagram of an example method 300 to interact with a network service based on an attribute manifest. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the security platform 120 of FIG. 1.

As shown in FIG. 3, the method 300 may begin with the processing logic receiving a public key from a security platform (block 310). For example, a user may receive a digital certificate from the security platform where the digital certificate includes a public key of the security platform. The processing logic may provide a request to use a network service (block 320). For example, the user may seek to interact with and/or provide data to the network service. The processing logic may subsequently receive an attribute manifest from the network service (block 330). For example, the attribute manifest may be received from a first network connection between the user and the network service that is different than a second network connection between the user and the security platform when the digital certificate was received. The processing logic may verify the attribute manifest from the network service by using the public key from the security platform (block 340). For example, the attribute manifest may include a signature and if the public key is used to successfully verify the signature from the attribute manifest, then the attribute manifest may be considered to be successfully verified. Otherwise, if the public key cannot verify the signature, then the attribute manifest may not be considered to be successfully verified. The processing logic may further interact with the network service based on the verified attribute manifest (block 350). For example, the user may interact with the network service based on the attributes of the network service listed in the attribute manifest. In some embodiments, the user may provide data to the network service based on the attributes of the network service. Further details with respect to the user interacting with the network service based on the attribute manifest are described in conjunction with FIG. 5.

Figure 4:
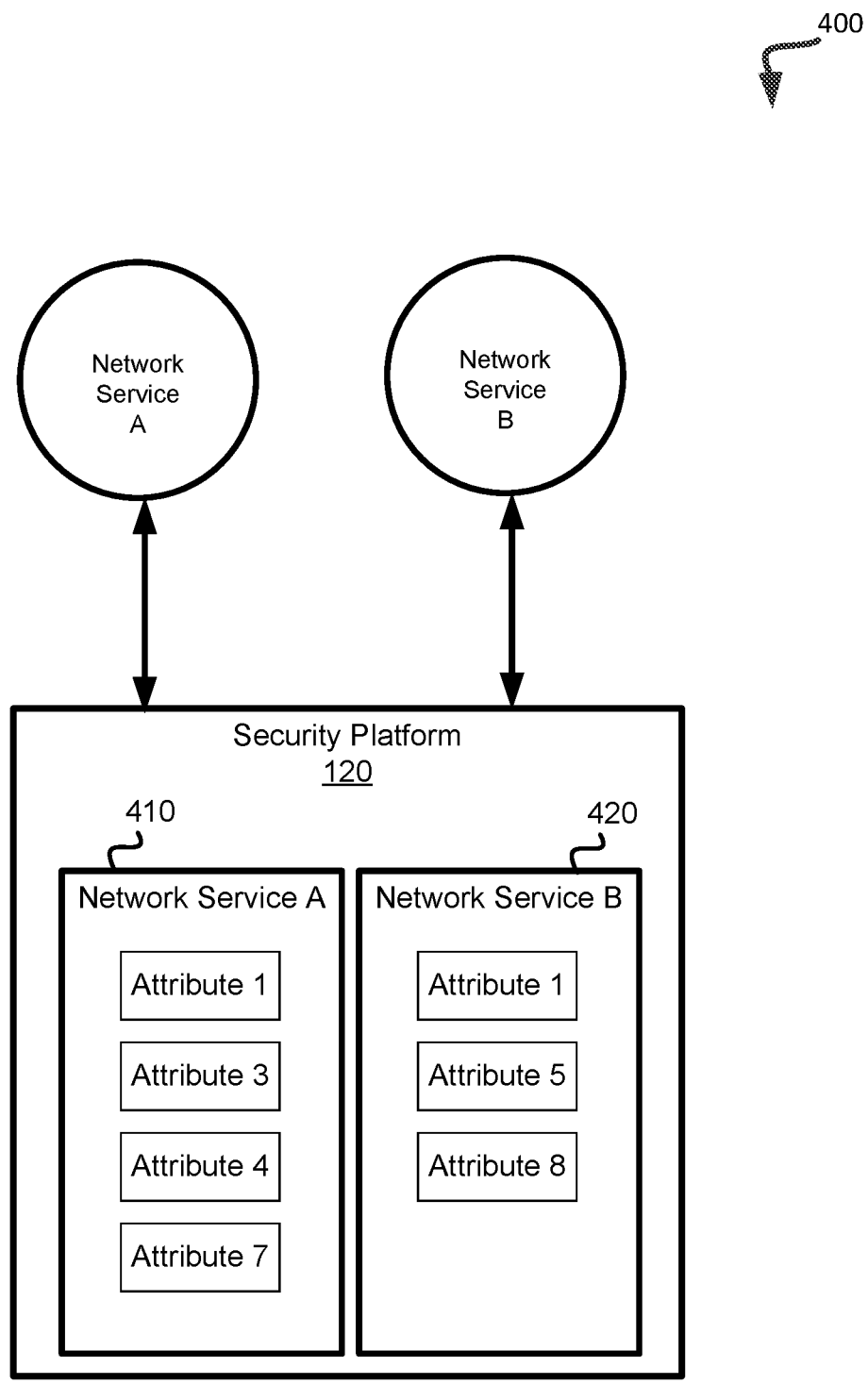
FIG. 4 illustrates an example of attribute manifests for different network services in accordance with some embodiments of the present disclosure.

FIG. 4 illustrates an example 400 of attribute manifests for different network services in accordance with some embodiments of the present disclosure. In general, the attribute manifests may be generated by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the attribute manifests may be generated by the security platform 120 of FIG. 1.

As shown in FIG. 4, the security platform 120 may generate different manifests for the different network services (e.g., network service A and network service B). For example, a first attribute manifest 410 may be assigned to the network service A and a second attribute manifest 420 may be assigned to the network service B. The network service A may be composed of a first group of software components and the network service B may be composed of a second group of software components. In some embodiments, the network service A and the network service B may share at least one identical software component while each respective network service having additional different software components. For example, the Attribute 1 may be assigned to the identical software component that is utilized and included in each of the network service A and the network service B. Since the network service A includes additional different software components than the network service B, then the Attributes 3, 4, and 7 may be assigned to the network service A based on the respective software components. Furthermore, the network service B may include the Attributes 5 and 8 based on its respective different software components. Thus, different attribute manifests may be generated for different network services that may include different groups of software components.

In some embodiments, each attribute manifest 410 and 420 may include an identification of the software code of the respect network service. For example, the attribute manifests may include a hash value of the software code of the respective network service. In the same or alternative embodiments, the attribute manifests may include other information of the network service. For example, each attribute manifest may identify a network location of the network service, the software components of the network service, the attributes assigned to each software component of the network service, a name and software version of the software components used in the network service, etc.

Figure 5:
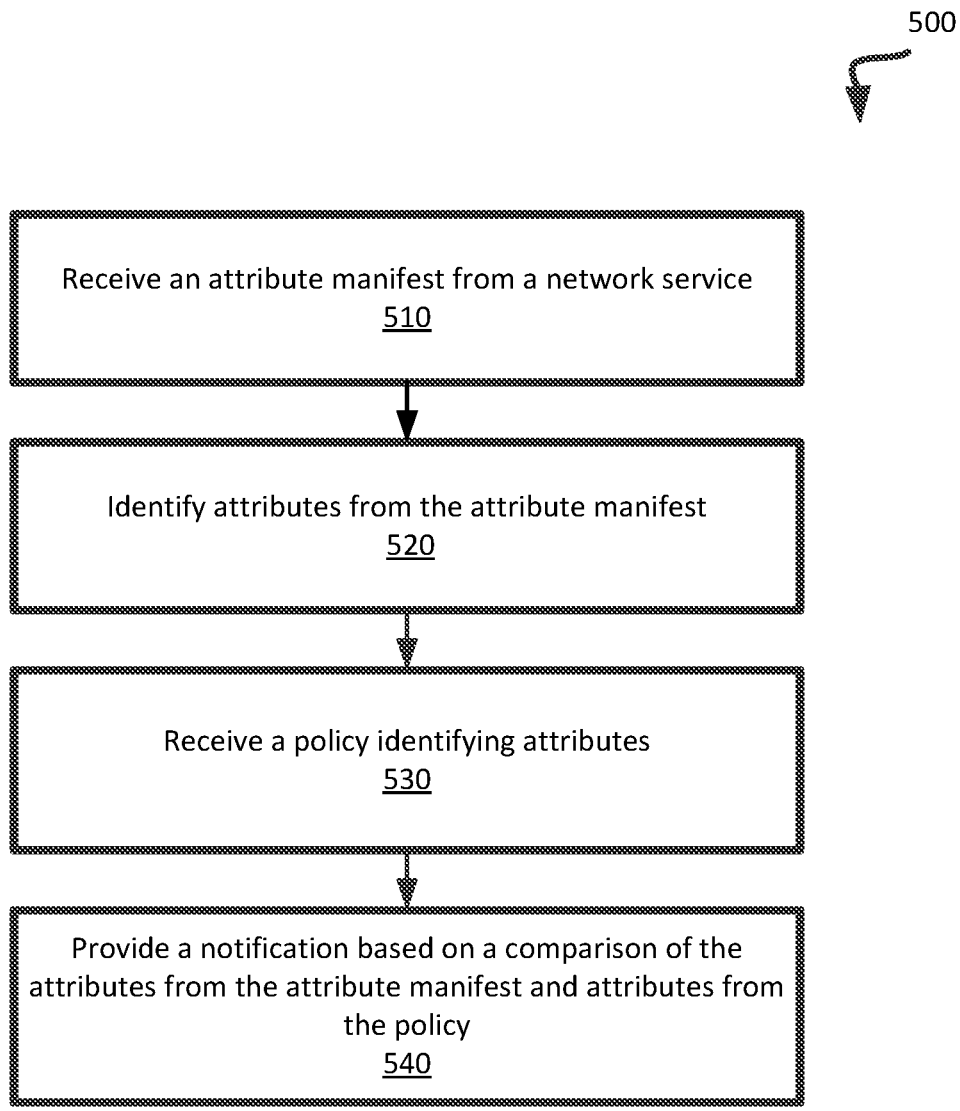
FIG. 5 is a flow diagram of an example method to provide a notification based on attributes of a network service in accordance with some embodiments of the present disclosure.

FIG. 5 is a flow diagram of an example method 500 to provide a notification based on attributes of a network service. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the user 140 of FIG. 1.

As shown in FIG. 5, the method 500 may begin with the processing logic receiving an attribute manifest from a network service (block 510). For example, the attribute manifest may be provided to a user after the user has connected with a network service. The processing logic may subsequently identify attributes from the attribute manifest (block 530). For example, the attribute manifest may be verified by the user and each of the attributes for the software components of the attribute manifest may be received. The processing logic may further receive a policy identifying attributes (block 530). The policy may be a predefined policy of the user that specifies one or more known attributes. The processing logic may further provide a notification based on a comparison of the attributes from the attribute manifest and the attributes from the policy (block 540). The notification may specify that the attributes of the network service satisfy or do not satisfy the policy. In some embodiments, the policy may specify that the data provided to the network service is to be secure (e.g., encrypted). If the attribute manifest from the network service does not indicate that the data provided to the network service is encrypted, then a notification may be provided to the user that the network service does not satisfy the policy. In some embodiments, the notification may be a message provided to the user or may be a message or other such notification provided to the user via a web browser or other such graphical user interface or application when accessing the network service.

In some embodiments, the graphical user interface (e.g., the browser or an application) may include one or more graphical elements (e.g., fields) for the user to provide data that is to be transmitted to the network service. The various graphical elements may be highlighted or otherwise noted (e.g., with a graphical element to indicate a warning) if the attributes of the network service do not satisfy the policy. As such, the policy may be used to provide a notification to a user when the attributes of the network service lack or do not satisfy one or more other attributes specified by the policy.

In some embodiments, the user may provide data via the graphical user interface to the network service. The user may indicate that the data may only be provided to the network service if the attributes of the network service includes at least one attribute specified by the user. For example, the data may be encrypted by the user based on a public key provided to the user by the security platform. The network service may then provide the encrypted data to the security platform. Subsequently, the security platform may decrypt the data with the corresponding private key if an attribute of the network service matches the attribute required by the user. The decrypted data may then be returned to the network service.

Figure 6:
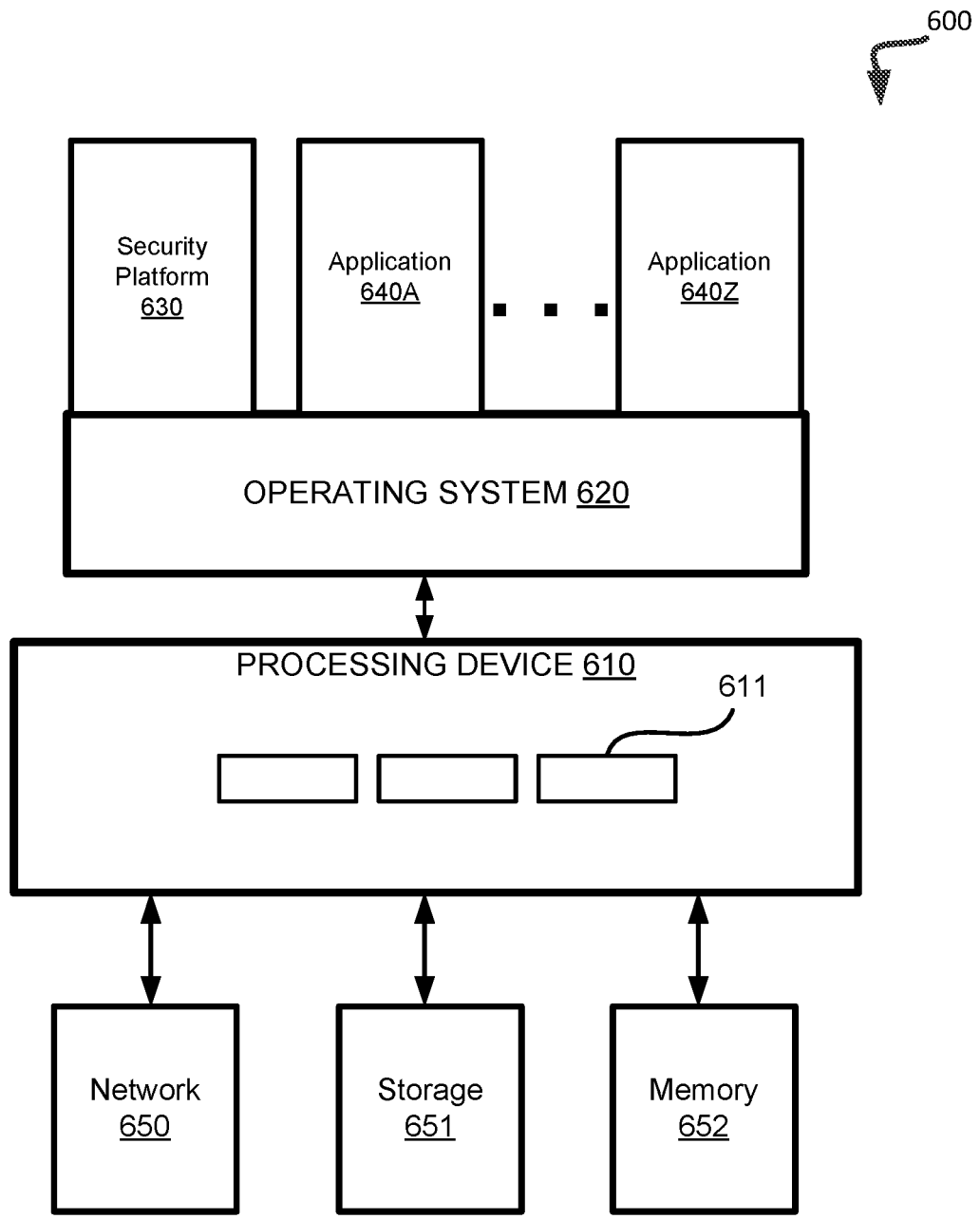
FIG. 6 illustrates an example server that provide an attribute manifest of a network server in accordance with some embodiments of the present disclosure.

FIG. 6 illustrates an example server that provides an attribute manifest of a network server. In general, the network service 110 or the security platform 120 of FIG. 1 may correspond to a network server that provides cryptographic operations for one or more other applications 640A to 640Z that are also hosted by the network server or another network server.

As shown in FIG. 6, the network server 600 may include a processing device 610 that may execute an operating system 620. Furthermore, the processing device 610 may include one or more internal cryptographic keys 611 that may be used to encrypt and decrypt data stored in a portion of a memory that is assigned to a secure enclave associated with a security platform 630. The access to the data of the security platform 630 in the secure enclave (e.g., data stored at a storage resource) may be protected from the one or more applications 640A to 640Z and the operating system 620. For example, the access to the data of the secure enclave corresponding to the security platform 630 may be protected by the use of one of the internal cryptographic keys 611 (e.g., the secure enclave key or a master key) that are internal to the processing device 610 so that the access to the data is based on a hardware access as opposed to a software access. The operating system 620 may be associated with a first privilege level and the operating mode component 630 and the applications 640A to 640Z may be associated with a second privilege level where the first privilege level of the operating system is more privileged than the second privilege level of the various applications that are run on the operating system 620 (e.g., the more privileged level allows access to more resources of the network server than the less privileged level). Thus, the operating system 620 may be allowed access to resources of the applications 640A to 640Z. However, since the operating mode component 630 is assigned to a secure enclave where access to the data of the secure enclave is based on the use of an internal cryptographic key 611 of the processing device 611, the operating system 620 may not be able to access the data of the operating mode component 630 despite having a more privileged level of access than the operating mode component 630. The master key that is used to decrypt data at the storage resource may be an internal cryptographic key 611.

In operation, the operating mode component 630 may be hosted on the network server with the applications 640A to 640Z. The application 640A may perform a function that may use a cryptographic operation with a cryptographic key. In order to securely store the cryptographic key and perform the cryptographic operation securely, the application 640A may establish a connection with a key management system of the server. The key management system may correspond to functionality of the security platform 630. For example, an attestation procedure may be performed by the application 640A to authenticate the key management system. After the key management system has been authenticated, a connection may be considered to be established between the application 640A and the key management system. The cryptographic key of the application 640A (e.g., used by cryptographic operation) may be provided to the key management system. Since the key management system is assigned to a secure enclave, the data of the key management system may be encrypted and protected by the use of an internal cryptographic key 611 (i.e., the master key) of the processing device 610. For example, the key management system may receive the cryptographic key of the application 640A and may transmit an instruction to the processing device 610 to store the received cryptographic key in the memory of its assigned secure enclave. In some embodiments, the key management system may transmit identification information of the key management system to the processing device 610 for the processing device 610 to load the received cryptographic key from the application 640A in the secure enclave of the key management system. The processing device 610 may use an instruction to use one of its internal cryptographic keys 611 that is based on the identification of the key management system to store the received cryptographic key in the memory of the secure enclave of the key management system. For example, the received cryptographic key may be securely (e.g., encrypted) stored in the storage 651 or memory 652 associated with the processing device 610 or at another storage resource over a network 650 (e.g., at a storage device of the storage resource). In some embodiments, one of the applications 640A to 640Z may provide a request to the key management system to generate a cryptographic key to be used in a cryptographic operation for the respective application 640A to 640Z. For example, the key management system may generate the cryptographic key and may store the cryptographic key in its memory of the secure enclave.

After the cryptographic key of the application 640A has been loaded in the secure enclave, the application 640A may subsequently request for a cryptographic operation to be performed with its cryptographic key. For example, the application 640A may provide a request to the key management system that identifies the cryptographic operation to be performed. The key management system may subsequently use an instruction so that the processing device 610 may use one of its internal cryptographic keys 611 that is based on the identification of the key management system to decrypt the data of the secure enclave of the key management system and to retrieve the cryptographic key. Subsequently, the cryptographic operation may then be performed (e.g., data may be decrypted or data may be signed by using the retrieved cryptographic key) by the processing device 610 and then the output of the cryptographic operation may be provided to the key management system which may return the output to the application 640A. In some embodiments, the internal cryptographic key 611 may be combined with additional information (e.g., the identification information of the key management system) to generate the master key for the key management system that is used to decrypt and/or encrypt data associated with the secure enclave of the key management system. Thus, since the processing device 610 uses its internal cryptographic key 611 to decrypt data and to perform the cryptographic operation, the cryptographic key received from the application may not be exposed external to the processing device 610.

As such, a network server may run a key management system and an application that may use the key management system for storing or loading keys and managing the use of the keys. The operating mode component 630 may modify a cryptographic item to indicate that the key management system is no longer running in a secure operating mode. Although FIG. 6 illustrates that the key management system may provide secure key management for an application 640A to 640Z on the same network server, the key management system may alternatively be hosted by another network server or may be hosted by another network server that is external to any data center or network cluster that includes the network servers hosting applications 640A to 640Z.

Figure 7:
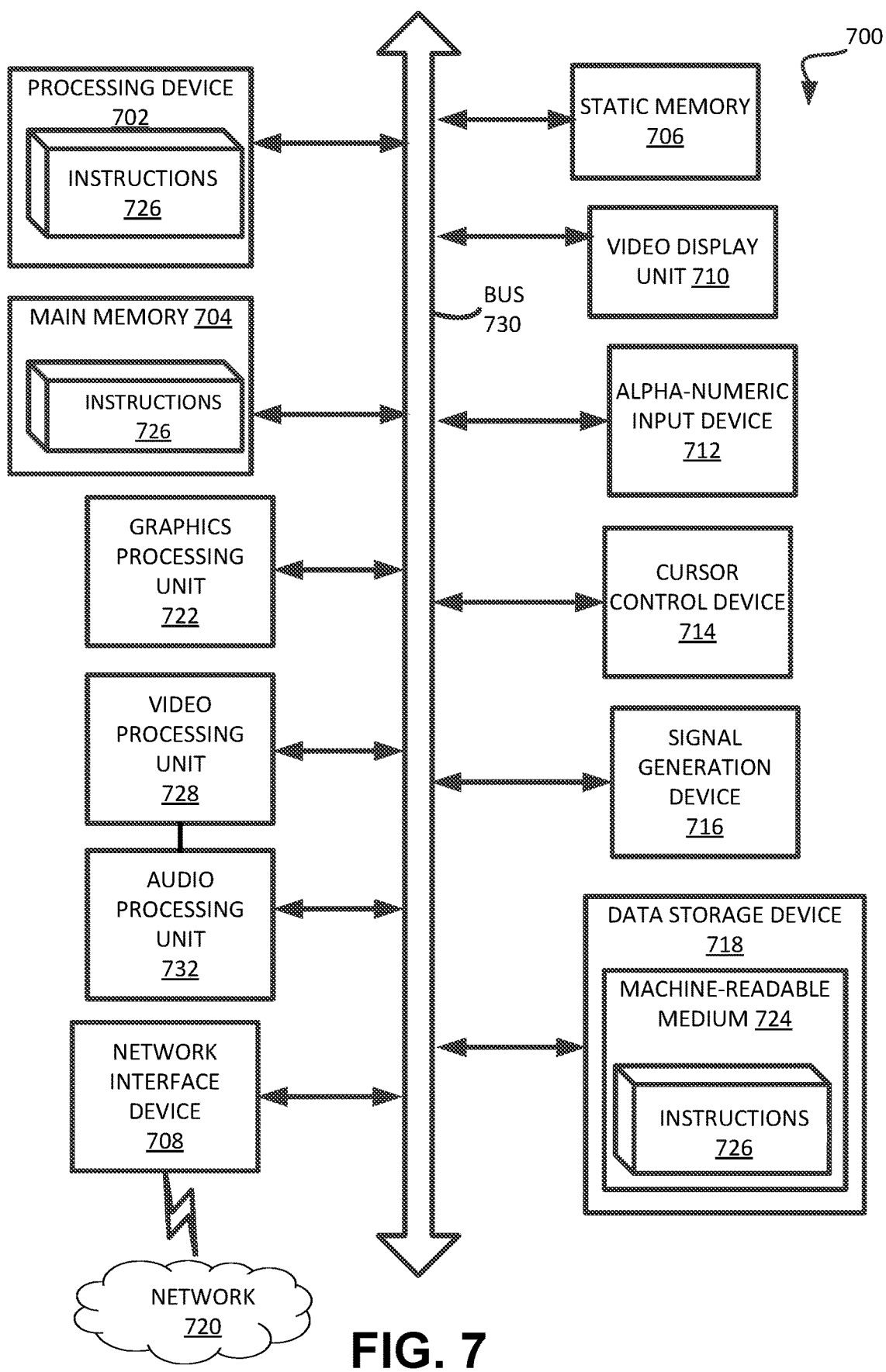
FIG. 7 illustrates an example computer system in which embodiments of the present disclosure operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality as described herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
identifying a network service;
determining one or more attributes of the network service;
generating, by a processing device, an attribute manifest for the network service based on the determined one or more attributes of the network service, wherein the generating of the attribute manifest is performed within a secure enclave of the processing device; and
sending the attribute manifest based on the determined one or more attributes to the network service.

2. The method of claim 1, wherein determining the one or more attributes of the network service comprises:
determining software components that are used to provide the network service;
identifying a portion of the one or more attributes based on the determined software components; and
receiving, from a third party evaluator, another portion of the one or more attributes for at least one of the software components.

3. The method of claim 1, further comprising:
signing the attribute manifest, wherein a signature of the attribute manifest is verified by a user of the network service to verify the one or more attributes of the network service that are specified in the attribute manifest.

4. The method of claim 1, wherein the attribute manifest corresponds to a list of attributes of the network service that have been verified by a security platform, and wherein the attribute manifest is to be transmitted to a user of the network service based on a connection between the user and the network service.

5. The method of claim 1, wherein the one or more attributes are associated with a data policy or a security policy of the network service.

6. The method of claim 1, wherein the attribute manifest includes an identification of software code associated with the network service and a network location of the network service.

7. A system comprising:
a memory; and
a processing device, operatively coupled with the memory, to:
identify a network service;
determine one or more attributes of the network service;

generate an attribute manifest for the network service based on the determined one or more attributes of the network service, wherein the generating of the attribute manifest is performed within a secure enclave of the processing device; and send the attribute manifest based on the determined one or more attributes to the network service.

8. The system of claim 7, wherein to determine the one or more attributes of the network service, the processing device is further to:

determine software components that are used to provide the network service;

identify a portion of the one or more attributes based on the determined software components; and receive, from a third party evaluator, another portion of the one or more attributes for at least one of the software components.

9. The system of claim 7, wherein the processing device is further to:

sign the attribute manifest, wherein a signature of the attribute manifest is verified by a user of the network service to verify the one or more attributes of the network service that are specified in the attribute manifest.

10. The system of claim 7, wherein the attribute manifest corresponds to a list of attributes of the network service that have been verified by a security platform, and wherein the attribute manifest is to be transmitted to a user of the network service based on a connection between the user and the network service.

11. The system of claim 7, wherein the one or more attributes are associated with a data policy or a security policy of the network service.

12. The system of claim 7, wherein the attribute manifest includes an identification of software code associated with the network service and a network location of the network service.

13. A non-transitory computer readable medium comprising data that, when accessed by a processing device, cause the processing device to perform operations comprising:

identifying a network service;

determining one or more attributes of the network service;

generating, by the processing device, an attribute manifest for the network service based on the determined one or more attributes of the network service, wherein the generating of the attribute manifest is performed within a secure enclave of the processing device; and sending the attribute manifest based on the determined one or more attributes to the network service.

14. The non-transitory computer readable medium of claim 13, wherein to determine the one or more attributes of the network service, the operations further comprise:

determining software components that are used to provide the network service;

identifying a portion of the one or more attributes based on the determined software components; and receiving, from a third party evaluator, another portion of the one or more attributes for at least one of the software components.

15. The non-transitory computer readable medium of claim 13, the operations further comprising:

signing the attribute manifest, wherein a signature of the attribute manifest is verified by a user of the network service to verify the one or more attributes of the network service that are specified in the attribute manifest.

16. The non-transitory computer readable medium of claim 13, wherein the attribute manifest corresponds to a list of attributes of the network service that have been verified by a security platform, and wherein the attribute manifest is to be transmitted to a user of the network service based on a connection between the user and the network service.

17. The non-transitory computer readable medium of claim 13, wherein the one or more attributes are associated with a data policy or a security policy of the network service.

* * * * *